US008451166B2

(12) United States Patent
Gayrard et al.

(10) Patent No.: US 8,451,166 B2
(45) Date of Patent: May 28, 2013

(54) DISTRIBUTED DISTANCE MEASUREMENT SYSTEM FOR LOCATING A GEOSTATIONARY SATELLITE

(75) Inventors: Jean-Didier Gayrard, Cugnaux (FR); Mathieu Dervin, Toulouse (FR); Bruno Celerier, Auribeau sur Siagne (FR)

(73) Assignee: Thales, Neuilly sur Seine (FR)

( * ) Notice: Subject to any disclaimer, the term of this patent is extended or adjusted under 35 U.S.C. 154(b) by 229 days.

(21) Appl. No.: 13/098,202

(22) Filed: Apr. 29, 2011

(65) Prior Publication Data

US 2011/0267229 A1    Nov. 3, 2011

(30) Foreign Application Priority Data

Apr. 30, 2010    (FR) ...................................... 10 01867

(51) Int. Cl.
*G01S 19/48*    (2010.01)
(52) U.S. Cl.
USPC .................................................... 342/357.31
(58) Field of Classification Search
USPC .................................................... 342/357.31
See application file for complete search history.

(56) References Cited

U.S. PATENT DOCUMENTS

| | | | |
|---|---|---|---|
| 5,041,833 A | 8/1991 | Weinberg | |
| 5,760,738 A * | 6/1998 | Kawano | 342/357.48 |
| 6,757,264 B1 | 6/2004 | Gayrard | |
| 6,864,838 B2 | 3/2005 | Harles et al. | |
| 8,185,785 B2 * | 5/2012 | Rainish et al. | 714/701 |
| 2011/0032867 A1 | 2/2011 | Gayrard et al. | |

FOREIGN PATENT DOCUMENTS

FR    2 621 132 A1    3/1989

OTHER PUBLICATIONS

"Satellite Earth Station and systems (SES); Technical Anaylsis of Spread Spectrum Solutions for Telemetry Command and Ranging (TCR) of Geostationary Communications Satellites; ETSI TR 101 956", ETSI Standards, Sep. 1, 2001, vol. SES-ECSS, No. V1.10.1, Lis, Sophia Antipolis Cedex, FR, XP014005037.

* cited by examiner

*Primary Examiner* — Harry Liu
(74) *Attorney, Agent, or Firm* — Baker Hostetler LLP

(57) ABSTRACT

A distance measurement system for locating a geostationary satellite equipped with a transponder includes: a central station emitting a distance measurement signal; and at least one measurement station receiving the emitted signal, including means for measuring the time of arrival of the emitted signal, and transmitted via the transponder of the satellite. The central and measurement stations, of known positions, include synchronization means with a common time base. The transponder is that of a satellite telecommunications system, and has a bandwidth B. The central station includes means for emitting a specific distance measurement signal, distinct from the telecommunications signals transmitted via the transponder, with periodic events and with spread spectrum, the bandwidth of which is included in B.

7 Claims, 12 Drawing Sheets

Central station

Measurement station

DISTRIBUTED DISTANCE MEASUREMENT SYSTEM FOR LOCATING A GEOSTATIONARY SATELLITE

CROSS-REFERENCE TO RELATED APPLICATION

This application claims priority to foreign French patent application No. FR 1001867, filed on Apr. 30, 2010, the disclosure of which is incorporated by reference in its entirety.

FIELD OF THE INVENTION

The field of the invention is that of locating geostationary satellites.

BACKGROUND

It is known to determine the position of a geostationary satellite by using a system comprising a dedicated station for measuring distance between this station and the satellite, such as a large emitting and receiving TCR (acronym standing for Telemetry Command and Ranging) station, and a specific transponder on board the satellite, included in the TCR subsystem. The distance measurement, obtained by measuring the phase shift induced by the propagation time and the passage through the TCR transponder of the satellite on a sinusoidal or tone ranging radiofrequency carrier and associated with an elimination of ambiguity, is done periodically (weekly, fortnightly or monthly) according to well established procedures. Between the measurement campaigns, the position of the satellite is deduced by orbit determination software. Such a system is costly.

Another solution presented in the U.S. Pat. No. 6,864,838, consists in using a satellite telecommunications system 200 by geostationary satellite SA which comprises, as can be seen in FIG. 1, a station 20 emitting a telecommunications signal 21 of digital video type formatted to the MPEG-2 and DVB-S standards, a telecommunications transponder 22 on board the satellite SA, and a number of stations 23 receiving the telecommunications signal, synchronized with the emitting station so as to have a common time base. The emitting and receiving stations are within the coverage 24 of the satellite SA. The position of the satellite is deduced from the measurement of the propagation time of the signal between the emitting station 20 and a receiving station 23 via the satellite SA. This propagation time is measured by observing known recurrent sequences of bits or unique words of the telecommunications signal 21. When these sequences of bits or unique words are recognized by the receiving station 23, the corresponding reception instant is used with the instant of emission of the start of these sequences of bits and the time base, to compute the propagation time. The knowledge of the geographic position of the broadcasting station 20 and of the receiving stations 23, and the distance measurements making it possible to compute the position of the satellite SA by known mathematical methods such as trilaterisation.

This system works only if the operator of the satellite has access to the telecommunications signal 21 in the broadcasting station 20, either to know the instant of emission to the satellite of unique words pre-existing in the signal, or to insert unique words into the signal at chosen instants. This solution which is included in the satellite telecommunications system, is therefore controlled by a telecommunications operator and/or by a broadcaster and/or by a satellite packager with respect to the telecommunications signal 21 and the broadcasting station 20, and by the satellite operator with respect to the satellite SA and the transponder 22. This solution cannot be used with the telecommunications operator and/or the broadcaster and/or the satellite packager.

Consequently, there still remains a need for a system that simultaneously satisfies all the abovementioned requirements, notably in terms of cost and independence relative to a telecommunications operator.

SUMMARY OF THE INVENTION

The satellite distance measurement system according to the invention is an alternative to the distributed system presented in the background.

It comprises a central station emitting a distance measurement signal, and at least one measurement station, receiving the emitted signal. The positions of the central station and of the measurement stations are known. The transponder of the satellite is that of a satellite telecommunications system, used to transmit commercial signals (TV for example). The distance measurement signal emitted by the central station is distinct from a telecommunications signal. This distance measurement signal is spread in frequency in the band of the satellite transponder, and its power spectral density is preferably set so as not to disturb the commercial signals. The distance measurement signal is advantageously synthesized by using a common time and frequency base which is synchronized on the time base of a satellite navigation system such as GPS or Galileo.

The distance measurement is thus based on:
  the emission by the central station of a distance measurement signal which is overlaid on the commercial telecommunications signals in a transponder of the satellite payload and,
  on the use of a common time base preferably synchronized on an external time base such as that of a satellite navigation system (GPS) to synchronize the local clocks of the central station and of the measurement stations and, if necessary, to synthesize the distance measurement signal.

More specifically, the subject of the invention is a distance measurement system for locating a geostationary satellite equipped with a transponder, which comprises:
  a central station emitting a distance measurement signal,
  one (or more) measurement stations receiving said distance measurement signal, including means for measuring the time of arrival of the signal emitted by the central station, and transmitted via the transponder of the satellite,
  the central station and the measurement stations, of known positions, including synchronization means with a common time base,
  a satellite position computation centre,
  means for uploading the measurements from the measurement stations to the computation centre.

It is mainly characterized in that:
  the transponder is that of a satellite telecommunications system, and has a bandwidth B,
  the central station comprises means for emitting a specific distance measurement signal, distinct from a telecommunications signal, with periodic events and with spread spectrum, the bandwidth of which is included in B.

This means there is no satellite resource (frequency band, radio power and hardware) dedicated to the distance measurement function.

Furthermore, it is thus possible to make distance measurements and therefore to locate the satellite automatically (without human intervention) and repetitively, every second for example, to increase the accuracy of location of the satellite and of the restoration of the orbit and to access the position variations such as drifts and drift velocities.

Furthermore, the receiving stations are inexpensive because they are based on consumer electronic components: parabolic antenna, LNB, personal computer, etc.

According to a characteristic of the invention, the power spectral density is set so that this signal does not affect the reception quality of the telecommunications signal.

The distance measurement signal may carry a stream of binary data, typically at low bit rate, that is to say below 1 kbit/s.

According to a first embodiment, the common time base is that of a satellite positioning system and the synchronization means of the central station and of the measurement stations include means for receiving satellite positioning signals.

The use of a common time base synchronized on the time base of a satellite navigation system such as the GPS system makes it possible to avoid equipping the emitting station with an ultra-accurate clock such as an atomic clock which is costly, which is, nevertheless, possible. This also simplifies the measurements of the arrival times in the receiving stations whose local clock is also synchronized on the time base of said satellite navigation system.

According to another embodiment, the central station includes a local clock which is the common time base and the synchronization means of the central station and of the measurement stations include means for emitting and receiving a two-way satellite time and frequency information transfer signal.

According to a characteristic of the invention, the means for uploading the measurements to the computation centre use the transmission means of a terrestrial telecommunication network, such as the Internet network or a mobile telephony network.

According to a variant, the measurement uploading means use the transponder of the satellite telecommunications system and the measurement stations have means for transmitting a spread-spectrum signal, the bandwidth of which is included in B and which comprises a stream of binary data including said measurements, and the central station has means for receiving said signal to recover the measurements and means for sending the recovered measurements to the computation centre.

According to a characteristic of the invention, the measurement signal emitted by the central station to the remote measurement station and the signal emitted by the remote measurement station to the central station may also include the time and frequency information.

The central station may also be a receiving measurement station.

The satellite telecommunications system typically operates in the frequency bands allocated to the satellite broadcasting service or to the fixed satellite service or to the mobile satellite service.

According to a particular embodiment, the computation centre includes means for determining the position of the geostationary satellite on the basis of the arrival time measurements made by:
- at least three measurement stations remote from the central station or
- at least two measurement stations remote from the central station and the central station, the latter also being a measurement station.

BRIEF DESCRIPTION OF DRAWINGS

Other characteristics and advantages of the invention will become apparent from reading the following detailed description, given as a nonlimiting example and with reference to the appended drawings in which.

From one figure to another, the same elements are identified by the same references.

DETAILED DESCRIPTION

Figure 1:
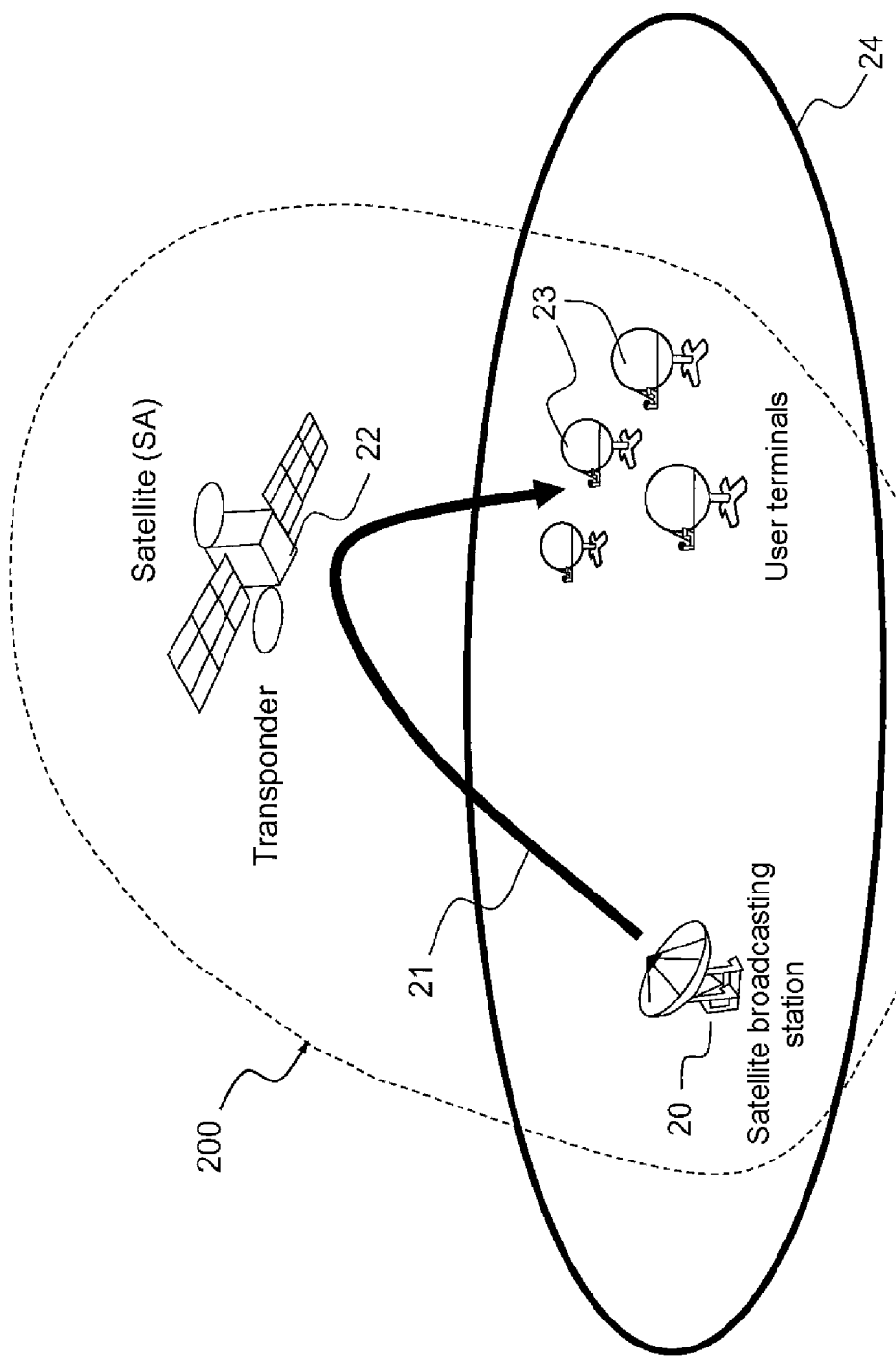
FIG. 1 schematically represents a satellite telecommunications system used to perform satellite distance measurements, according to the prior art, FIG. 2 schematically represents a distributed satellite distance measurement system, according to a first embodiment of the invention, FIG. 3 schematically illustrates examples of power spectral density of the signals that are overlaid in the transponder and an exemplary chart making it possible to estimate the degradation imparted by the distance measurement signal on a digital video signal, FIG. 4 schematically represents the principle of the measurement of the arrival time of the periodic events contained in the distance measurement signal performed by a remote measurement station, FIG. 5 schematically represents the means implemented in the emitting central station in a first embodiment of the invention, FIG. 6 schematically represents the means implemented in a remote measurement station in a first embodiment of the invention, FIG. 7 schematically represents a distributed satellite distance measurement system, according to a second embodiment of the invention, FIG. 8 schematically represents the principle of the synchronization of the local clocks of the remote measurement stations on the common time base in a second embodiment of the invention, FIG. 9 schematically represents the means implemented in the central station in a second embodiment of the invention, FIG. 10 schematically represents the means implemented in a measurement station in a second embodiment of the invention, FIG. 11 schematically illustrates an exemplary geometrical configuration associated with the determination of the position of the satellite by trilaterisation computations, in the case of a central station and three remote measurement stations, FIG. 12 schematically illustrates an exemplary geometric configuration associated with the determination of the position of the satellite by trilaterisation computations, in the case of an emitting and receiving central station and two remote measurement stations.
Figure 2:
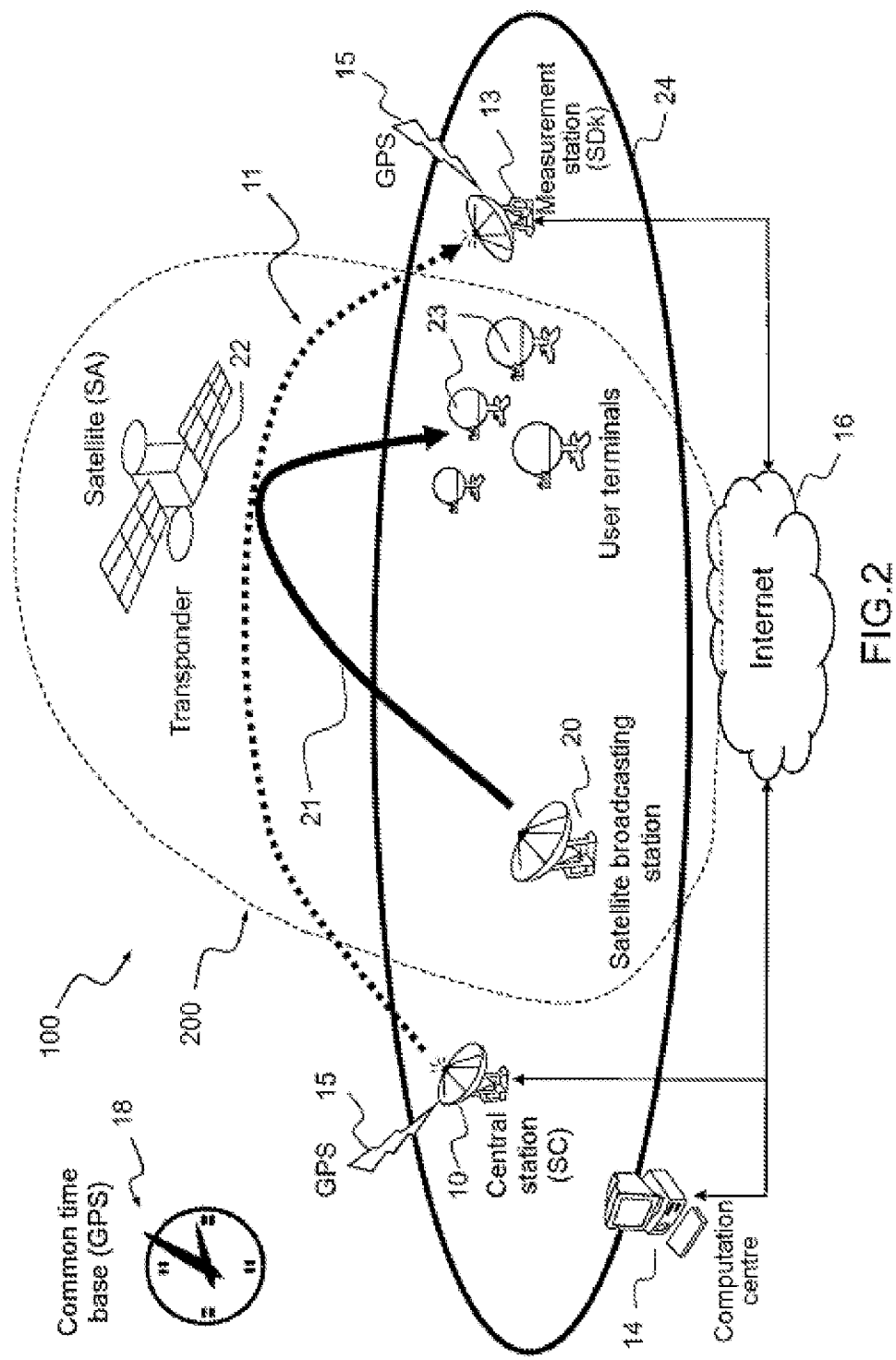

The distance measurement system 100 according to the invention, according to a first embodiment, is described in relation to FIG. 2.

It comprises an emitting central station 10 which emits, to receiving remote measurement stations 13 (a single measurement station is represented in the figure in order to keep the figure simple), a distance measurement signal 11 with periodic events and with spread spectrum via the transponder 22 of a satellite SA of a telecommunications system 200, called telecommunications transponder. The system 100 according to the invention uses the transponder of another system, in this case that of a satellite telecommunications system 200. The emitting central station 10 is distinct from that 20 of the telecommunications system in that the signal 11 emitted by the station 10 is distinct from the telecommunications signal 21 emitted by the station 20. The two emitting stations 10 and 20 may, possibly, be located in the same place.

The distance measurement signal 11 is typically a recurrent spreading code such as a direct sequence of finite length, modulating a radiofrequency carrier. If appropriate, the distance measurement signal 11 also contains a stream of binary data at low bit rate D(t), that is to say below 1 kbit/s, typically to convey time and frequency information as will be seen later, or to transmit auxiliary data such as data relating to the state of the system, calibration data, measurement station configuration remote controls, etc. This distance measurement signal is specific to this application; it is distinct from the telecommunications signal 21 but has to be able to be transmitted by the telecommunications transponder 22. Its spectrum occupies all or part of the bandwidth B of the telecommunications transponder. B is typically between 22 MHz and 72 MHz in the case of a transponder of a satellite telecommunications system operating in the Ku band (10.7 GHz to 14.5 GHz).

The device of the invention also operates in any transponder of a satellite telecommunications system operating in the frequency bands that are allocated by the International Telecommunications Union (ITU) to the Fixed Satellite Service (FSS), to the Satellite Broadcasting Service (SBS) and to the Mobile Satellite Service (MSS), and the bandwidth B of which is sufficient to spread the distance measurement signal. It is preferably spread so that its power spectral density is below the power spectral density of the noise of said transponder.

Various spectrum spreading techniques can be used. These include spreading by direct sequence, also called "pseudonoise (PN) spread", by frequency hopping or by ultra wide band. In a preferred embodiment of the invention, the distance measurement signal is a low bit rate binary signal spread in frequency by recurrent direct sequence of finite length, also called pseudorandom noise code. The structure of this signal R(t) can be modelled as a function of time t by:

$$R(t)=A(t)C(t)D(t)\sin(2\pi f_o + \Phi_o)$$

in which A(t) is the amplitude of the signal, C(t) is the recurrent direct sequence of finite length or code, D(t) is the low bit rate stream of system data, fo is the carrier frequency, $\Phi_o$ is the initial phase of the carrier.

Figure 5:
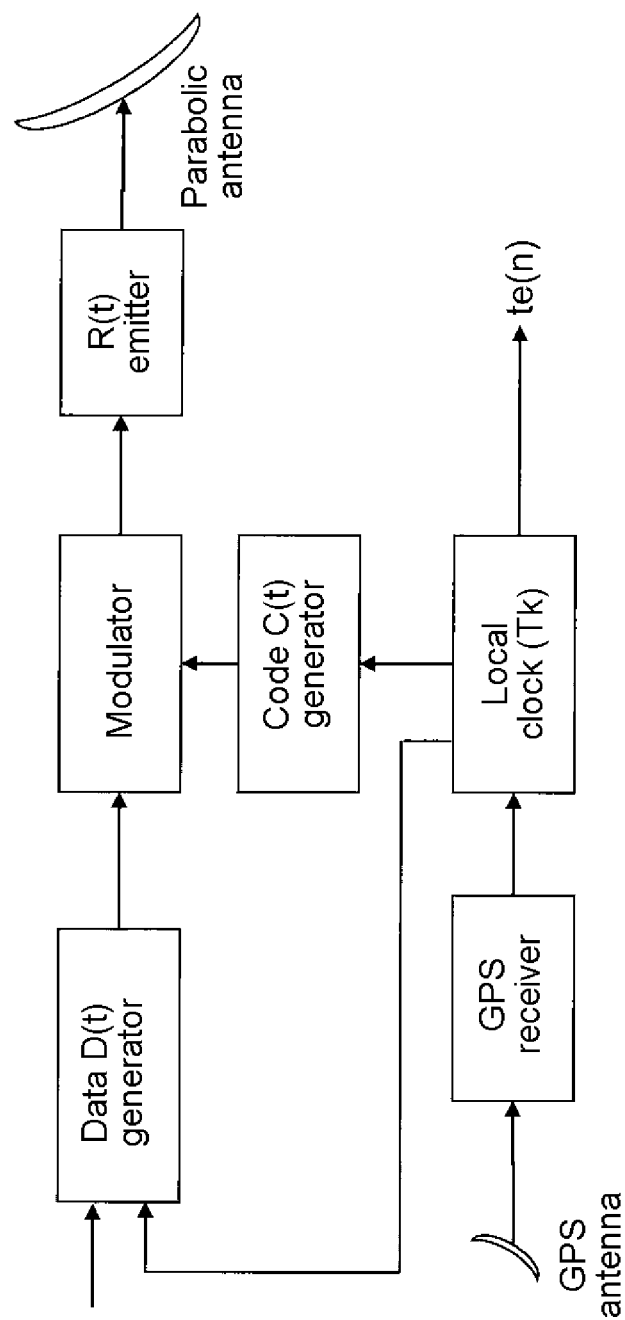

Furthermore, as shown in FIG. 5, the distance measurement signal R(t) is transmitted to the satellite, with an emission power and a spectral spread such that the ratio of the power spectral density Ro of the signal 11 to the power spectral density No of the thermal noise 24, the ratio being measured at the input of the transponder, is such that the degradation "d" of the total signal S to noise N ratio of the commercial telecommunications signals 11 is negligible. The total signal-to-noise ratio (S/N)t of the telecommunications signal 11 is equal to the inverse of the sum of the inverses of the signal-to-noise ratios (S/N)m of the uplink and (S/N)d of the downlink. Since the radiofrequency power of the satellite is generally limited, it is commonplace for the signal-to-noise ratio (S/N)m of the uplink to be stronger than the signal-to-noise ratio (S/N)d of the downlink in a ratio z greater than 1 [(S/N)m=z(S/N)d]. The degradation "d" of the total signal-to-noise ratio (S/N)t of the commercial telecommunications signals 11 which is imparted by the presence of the distance measurement signal 11 is evaluated by the formula:

$$d=(z+1)/(z+1+Ro/No)$$

Figure 3:
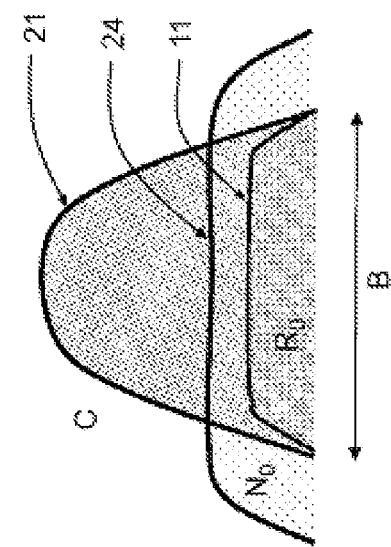
Figure 3:
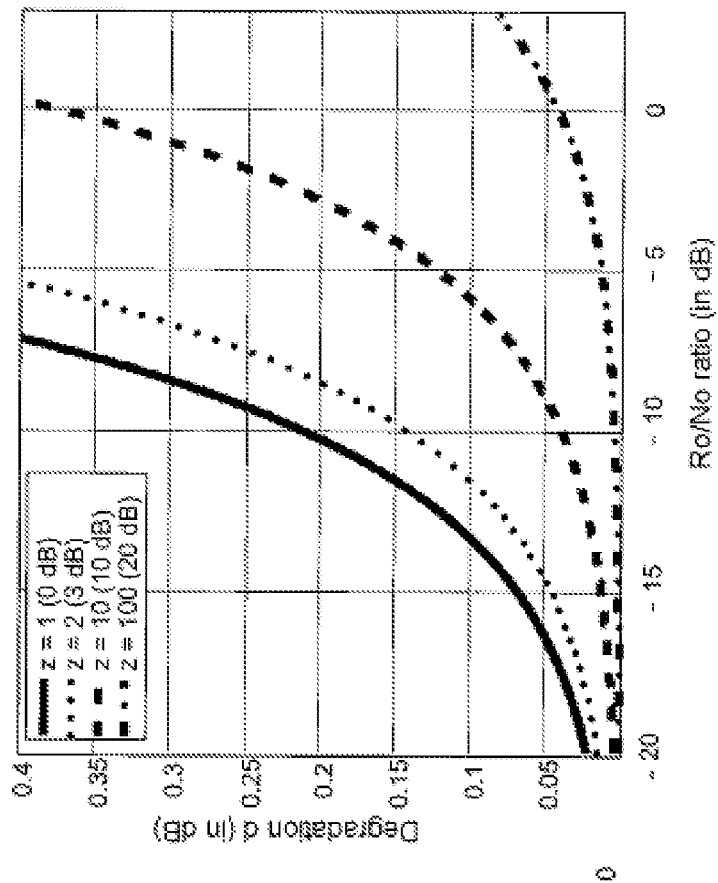

As an illustration, FIG. 3 gives the degradation "d" inferred from the total signal-to-noise ratio of the telecommunications signal 11 as a function of the measurement signal-to-noise ratio Ro/No and of the ratio z.

This distance measurement signal 11 may, if necessary, include a low bit rate binary signal D(t) conveying auxiliary information intended for the measurement stations, such as, for example: the name of the satellite, date, time, carrier frequency, calibration data, maintenance data, etc.

The wave form (which defines the signal) makes it possible to perform accurate distance measurements and is synthesized with the common time base 18 which, in a preferred embodiment of the invention, is synchronized on an external time reference of GPS type for example.

Preferably, this distance measurement signal R(t) is similar to a navigation signal of GPS or Galileo type. Thus, for example, the distance measurement signal has the following characteristics:

C(t) spreading signal (direct sequence) at the rate of 18 Mchip/s,
D(t) binary signal (information stream) at the rate of 1000 bits per second,
period of the direct sequence (event): 1 millisecond,
BPSK modulation or any other modulation of the same type.

The bit rate of the information stream D(t) is set according to the transmission conditions on the link from the emitting central station 10 to the remote measurement station 13 via the transponder 22 of the satellite SA. In particular, the maximum rate is determined by the combination of the values of a number of parameters of the telecommunications 200 and distance measurement 100 systems, such as, for example, the signal-to-noise ratio (S/N)t of the telecommunications signal 11, the degradation "d", the ratio z, the figure of merit of the receiving measurement station (G/T), etc.

Figure 4:
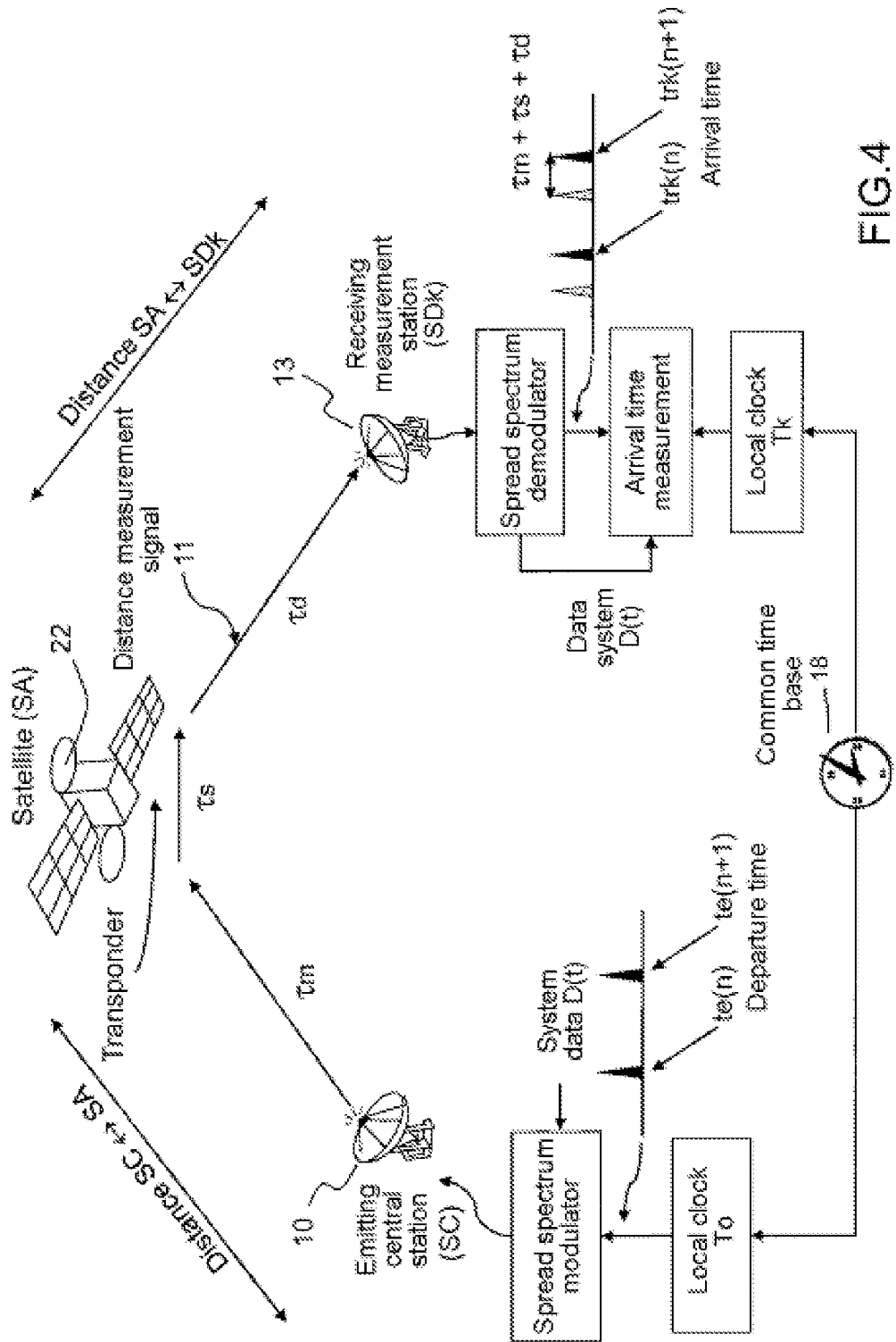

The distance measurement system 100 also comprises at least one measurement station 13 usually remote from the central station 10. Each measurement station 13 receives the distance measurement signal 11 which is, for example, a recurrent direct sequence of finite length C(t). It includes means for detecting and extracting the distance measurement signal overlaid on the telecommunications signal 21 in a conventional manner known to those skilled in the art, by correlation with a local replica of the direct sequence. In this way, the low bit rate binary signal of D(t) is extracted from the telecommunications signal 21 and can then be demodulated by appropriate hardware as illustrated in FIG. 4.

The recurrent direct sequence of finite length C(t) is used to make the measurement of the arrival time of the periodic events which are, in this embodiment, the beginnings of the direct sequence. The arrival time of the beginning of the direct sequence is measured on the basis of the local clock Tk of the receiving measurement station 13 by an appropriate means and known to those skilled in the art.

The pseudo-distance (PD) between the emitting station and the receiving measurement station via the satellite is given by the formula $$PD=c[tr(n)-te(n)]$$

in which c is the speed of light, te(n) is the time of the emission of the nth beginning of the code measured with the local clock To of the emitting central station and tr(n) is the measurement of the arrival time of the nth beginning of the code measured with the local clock Tk of the receiving remote station k. This pseudo-distance is different from the real distance because it contains errors. The main error is due to the bias between the local clock of the emitting station and the local clock of the receiving station [To-Tk]. The synchronization of all the local clocks on a common time base 18 makes it possible to eliminate the bias or ascertain the value from it and thus eliminate or reduce the error on the distance. The other errors are known or measurable and are compensated by means known to those skilled in the art (Sagnac effect, non-frequency-reciprocity of the propagation times, crossing of the ionosphere, etc.).

The local clocks Tk of the remote stations 13 are synchronized with the local clock To of the central station 10 to have a common time base 18.

Figure 6:
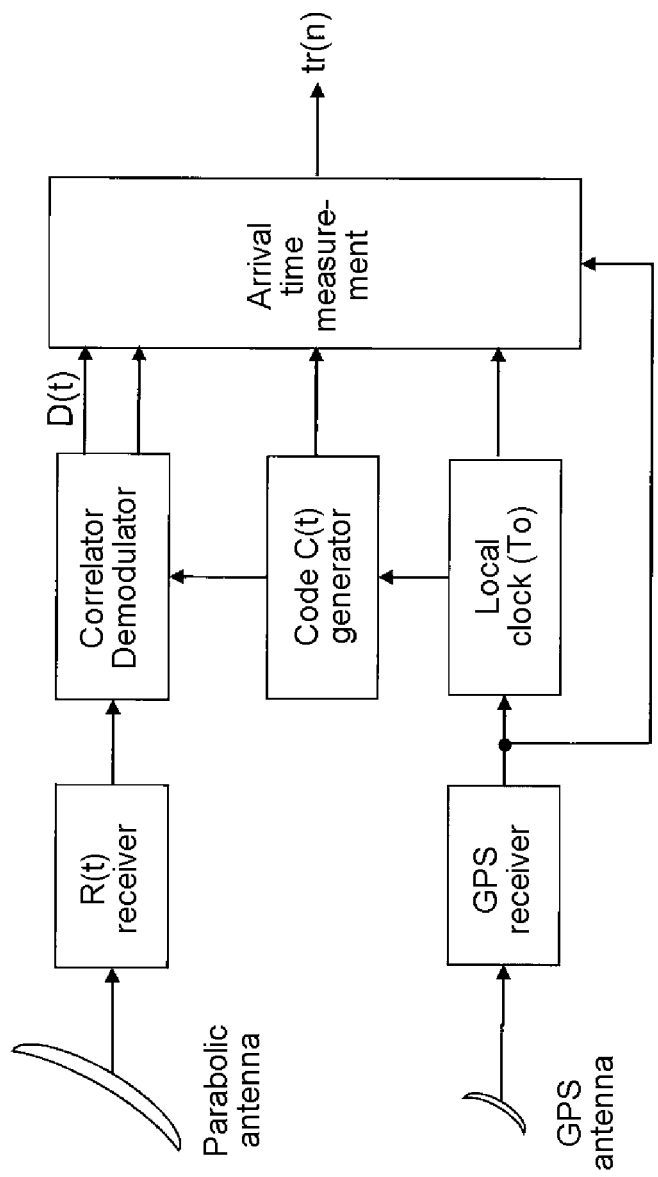

This synchronization can be obtained by taking a common time base external to the system, such as, for example, the time supplied by a satellite positioning system such as the GPS or Galileo system. The stations 10 and 13 are then equipped with means 15 for receiving a satellite positioning signal of GNSS type as can be seen respectively in FIGS. 5 and 6.

Figure 7:
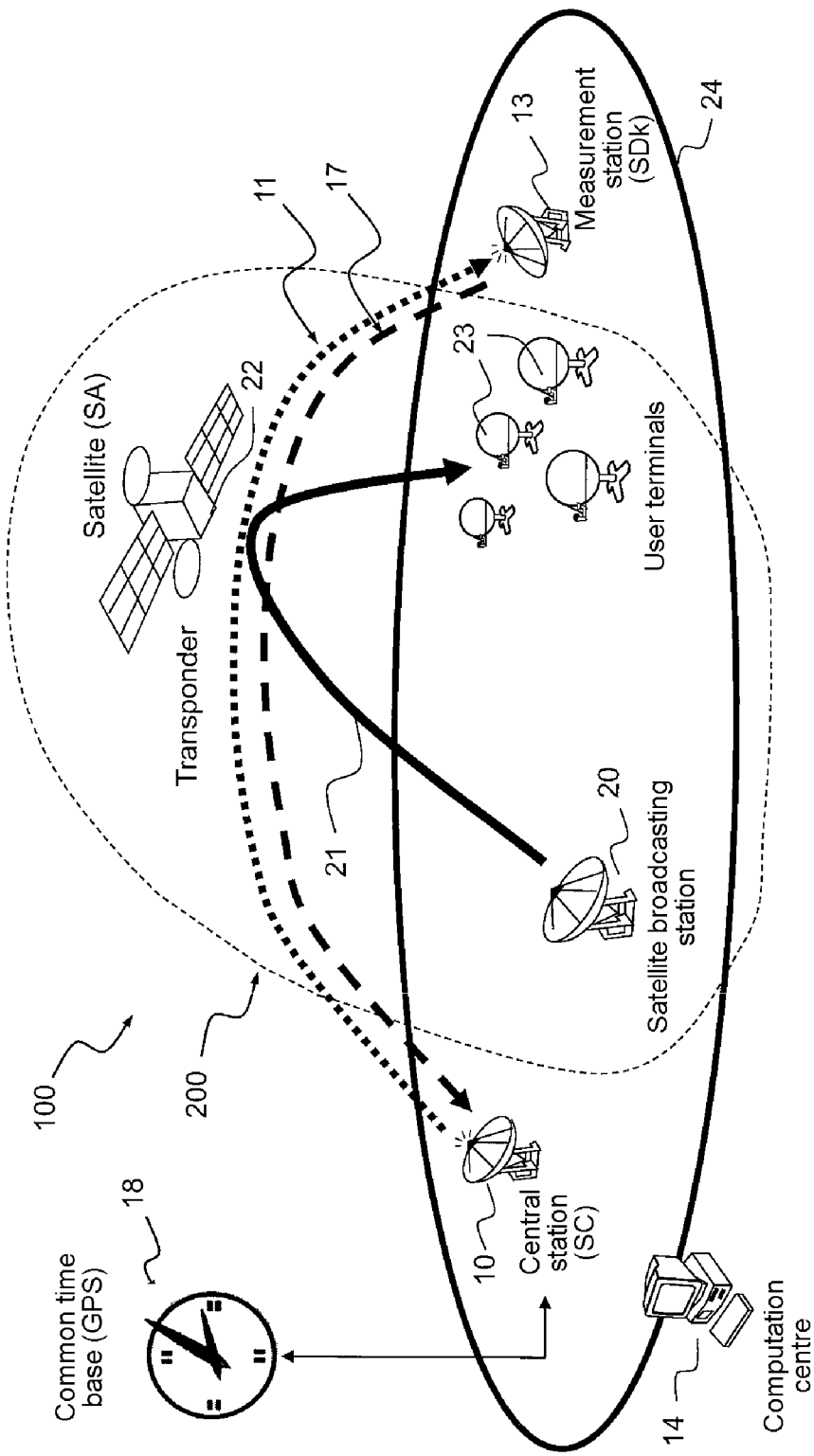
Figure 8:
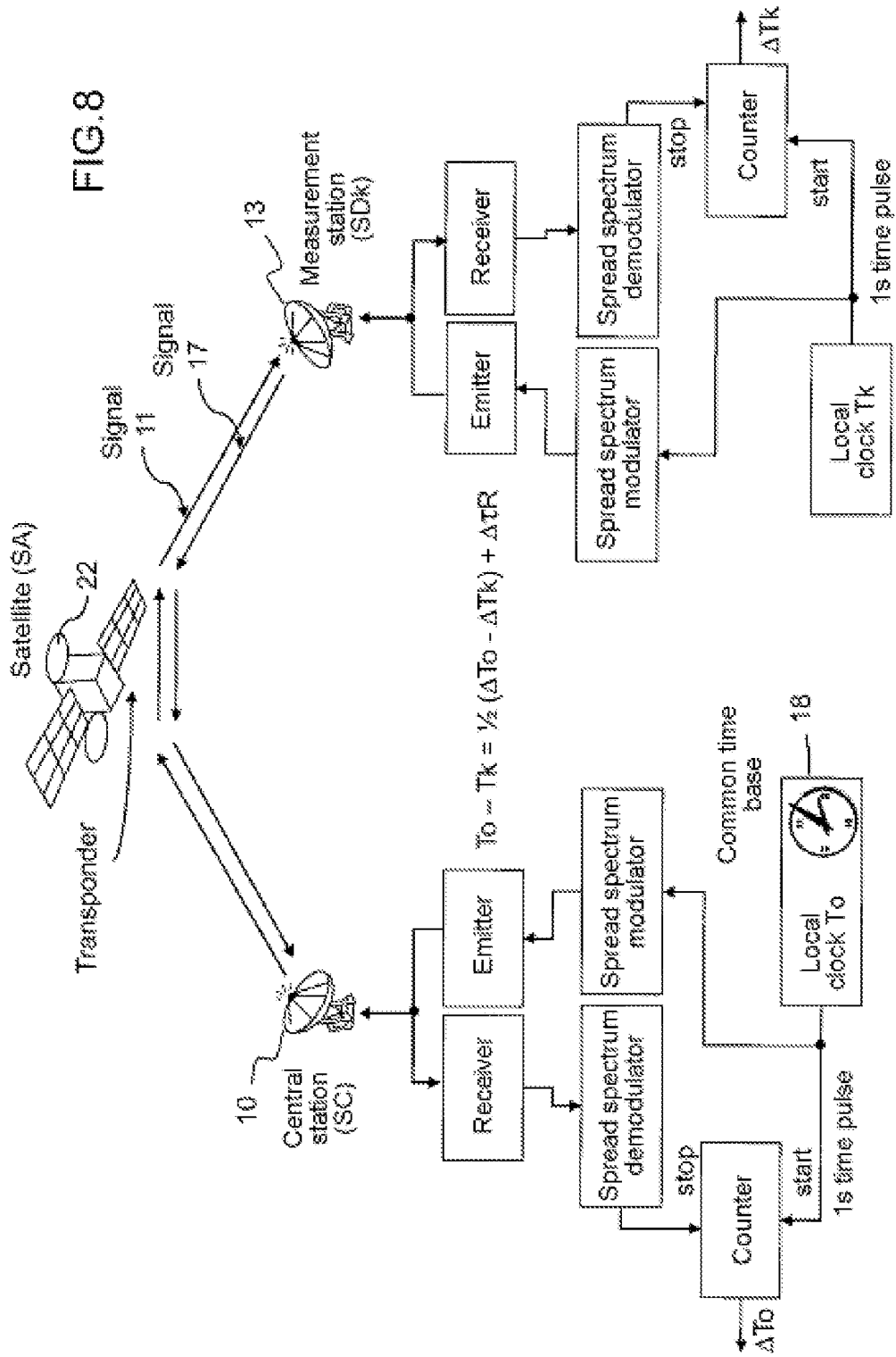

A common time base can also be obtained by equipping the central station 10 with an atomic clock. This clock is the reference for the common time base. This embodiment of the invention is illustrated in FIG. 7. The stations 10 and 13 are then equipped, for example, with two-way satellite time and frequency signal transfer means (TWSTFT) as shown in FIG. 8. The stations 10 and 13 are emitting and receiving stations for this functionality. A regular synchronization of the local clock of each station 13 with the atomic clock of the station 10 is necessary to ensure the accuracy of the distance measurement.

The radiofrequency signals used for the two-way satellite time signal transfer will pass through the transponder 22 of the satellite SA of the telecommunications system 200.

Figure 9:
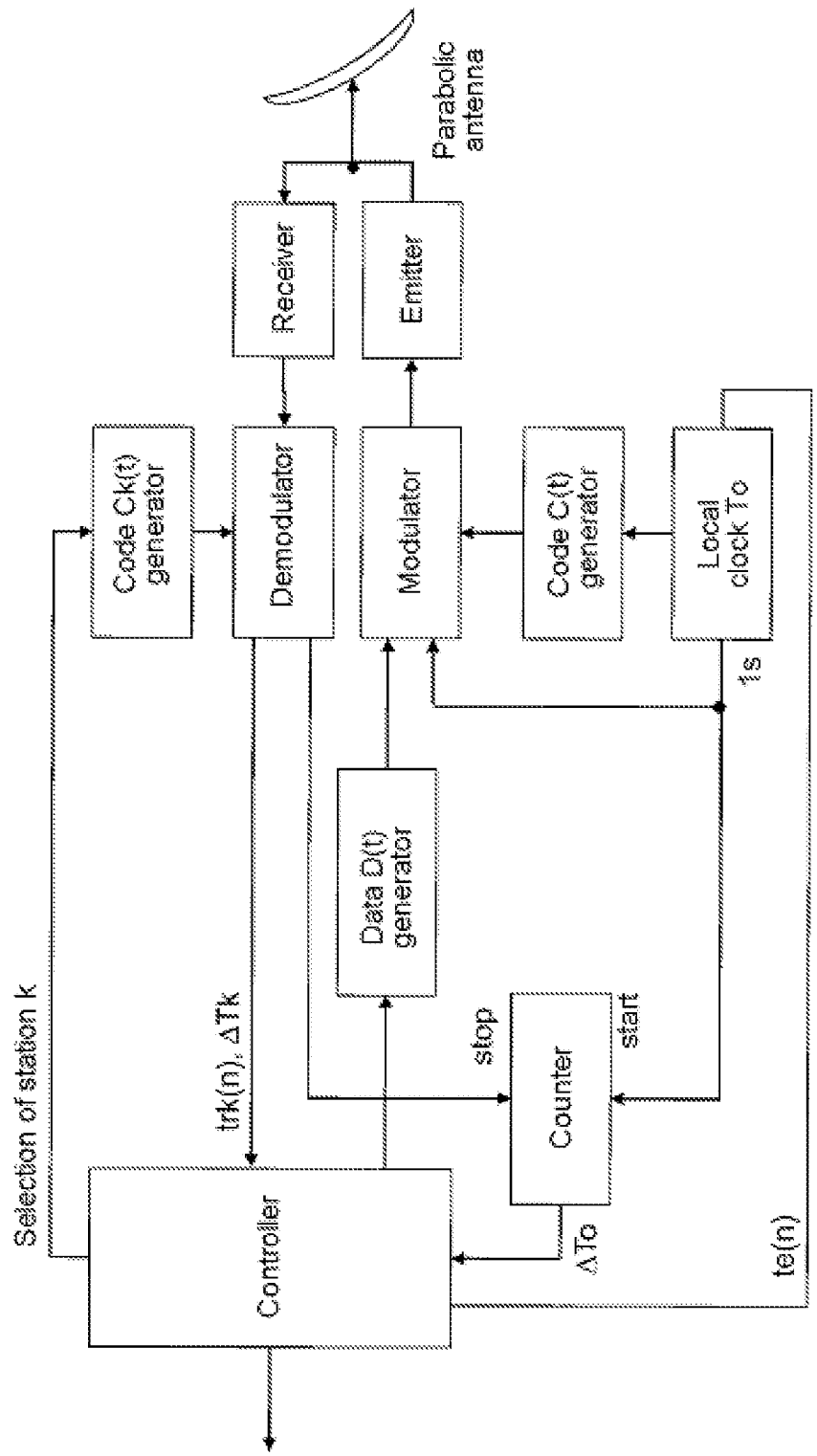
Figure 10:
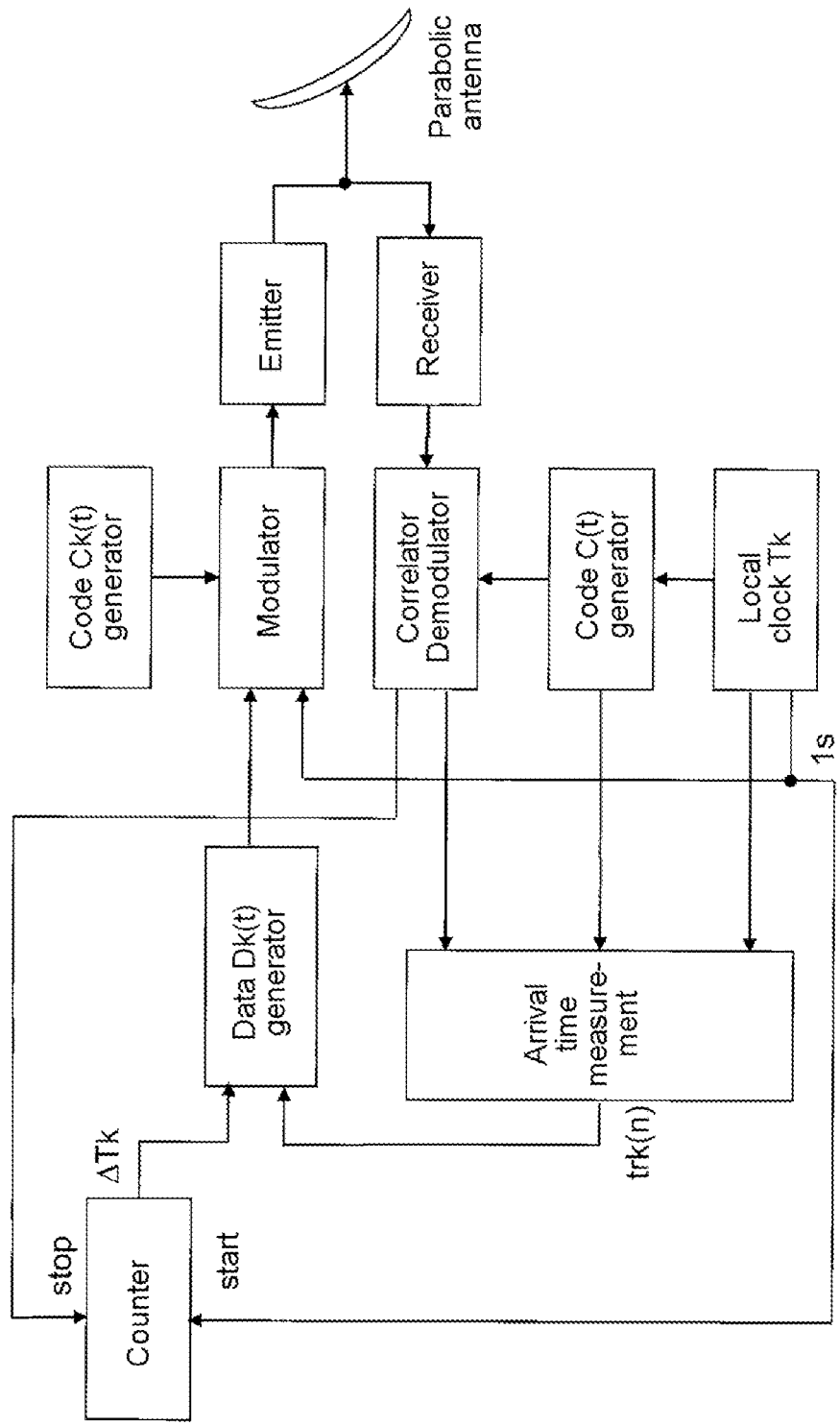

The stations 10 and 13 include means for emitting and receiving a specific two-way satellite time transfer signal, that can be seen in FIGS. 9 and 10, distinct from a telecommunications signal, with spread spectrum, the bandwidth of which is included in B and the power spectral density of which is preferably set so that this signal does not affect the reception quality of the telecommunications signal.

The two-way satellite time information transfer signal may be combined or merged, as shown in FIGS. 7 and 8, (but not necessarily):

in the central station 10 to measurement station 13 direction, with the emitted distance measurement signal 11, and in the measurement station 13 to central station 10 direction, with the signal 17 including the measurements.

The central station 10 and the measurement stations 13 are within the coverage 24 of the telecommunications satellite SA.

The distance measurement system 100 also comprises a computation centre 14 which determines the position of the satellite SA, from the measurements of the emission times of the events te(n) by the central station 10 and from the measurements of the arrival times of the events trk(n) by the measurement stations 13; each of the measurement stations periodically sends the distance measurement signal periodic event arrival time measurements (the beginning of the direct sequence in one of the embodiments of the invention).

The computation centre 14 computes the distance between the central station 10 and the kth measurement station 13 via the satellite SA[SC–SA+SA–SDk]. Finally, the computation centre 14 computes the position of the satellite by well known trilaterisation methods.

Figure 11:
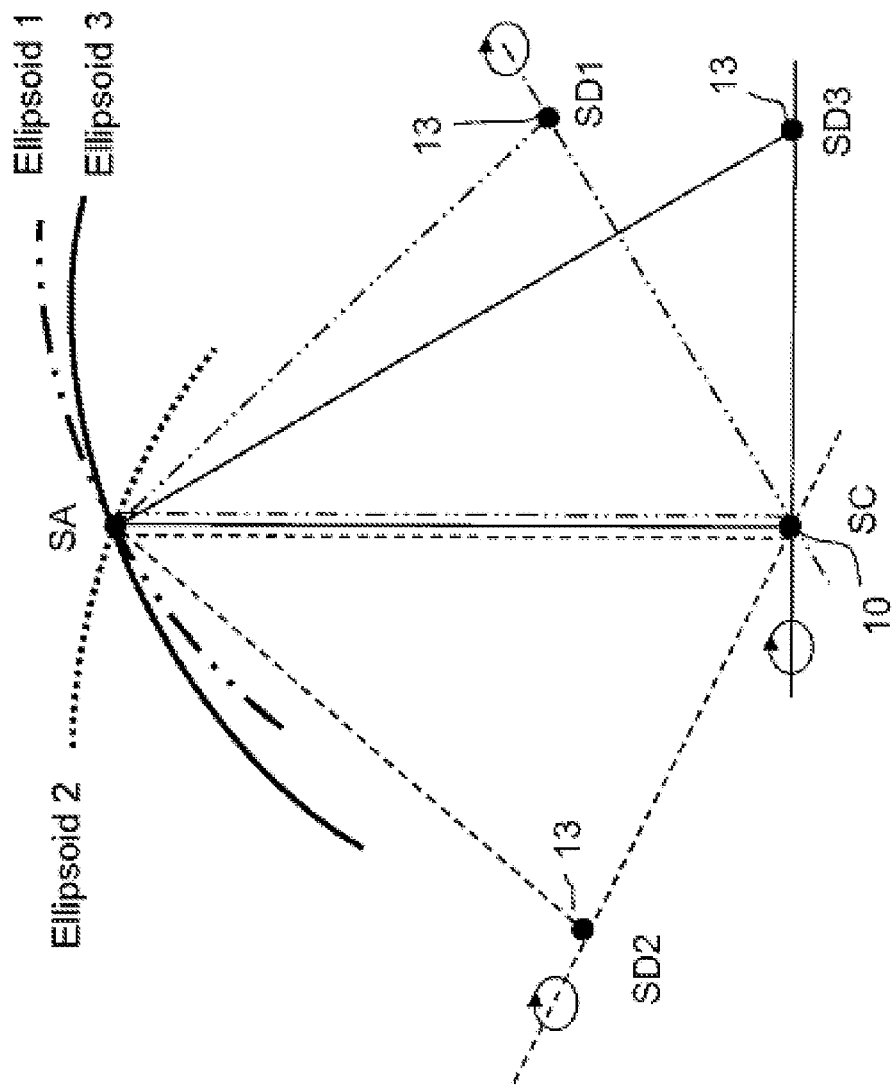

FIG. 11 schematically illustrates an exemplary geometric configuration associated with the determination of the position of the satellite by trilaterisation computations, in the case of a central station and three measurement stations remote from the central station. The satellite SA is on an ellipsoid of revolution about the axis linking the two focal points: central station SC for distance measurement 10 and a remote station SDk for distance measurement 13. With three distance measurements by three separate remote stations SD1, SD2 and SD3, the position of the satellite SA, which is at the intersection of the three ellipsoids, is computed in a conventional way. The position of the satellite SA is all the more accurate when the ellipsoids are distinct, that is to say, when the remote measurement stations 13 are most distant from one another.

Figure 12:
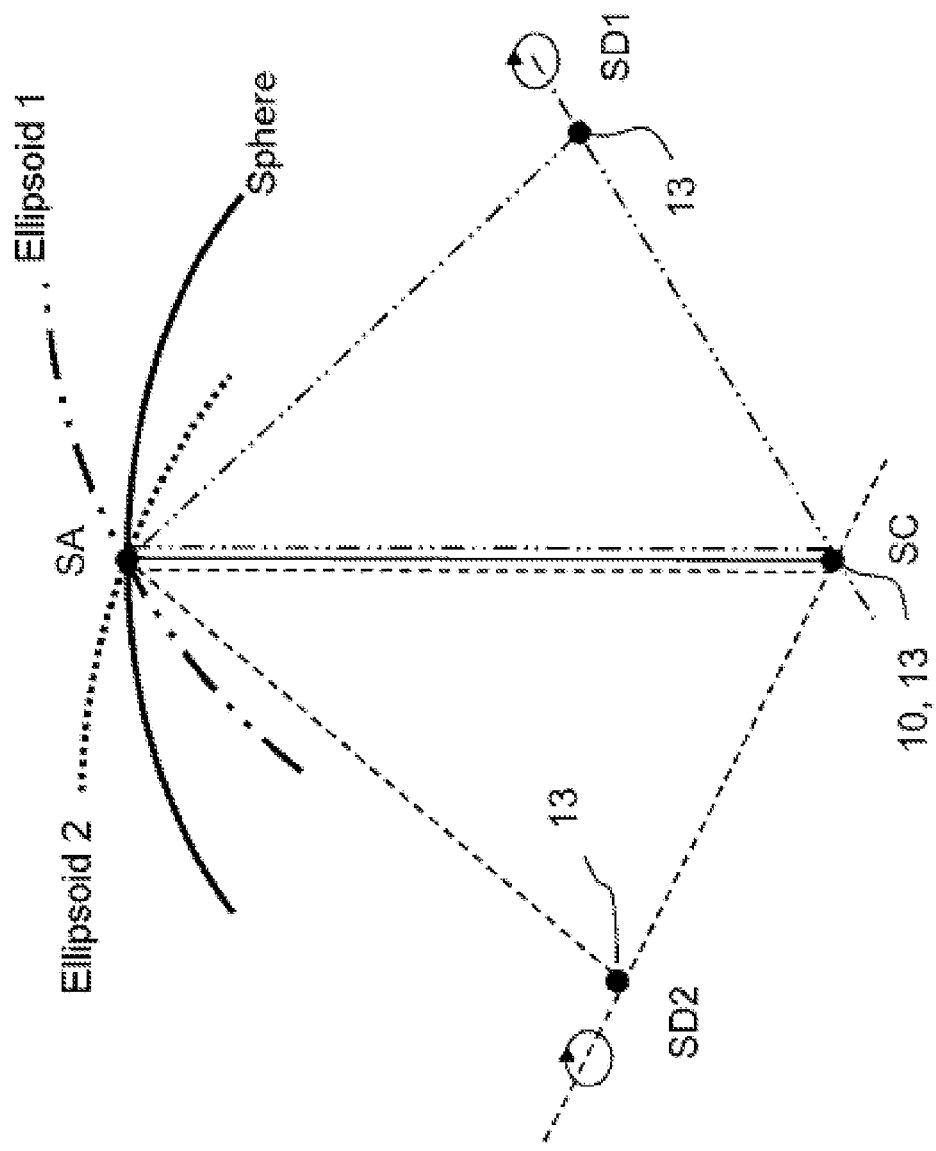

FIG. 12 schematically illustrates an exemplary geometric configuration in which the central station SC 10 is also a measurement station 13. The satellite SA is on a sphere whose radius is the distance SC-SA and whose centre is the central station SC. With two distance measurements by two remote stations SD1, SD2, the position of the satellite SA, which is at the intersection of the sphere and of the two ellipsoids, is computed in a conventional way.

The computation centre 14 may be located in the central station 10, but not necessarily; in this case, it is linked to it by conventional means such as a terrestrial telecommunications network (Internet, telephone line, leased line, etc.).

The arrival time measurements trk(n) can be sent by the remote measurement stations 13 to the central station 10 and/or directly to the computation centre 14 in different ways. The means may be the Internet network 16 as in the first embodiment illustrated in FIG. 2 or satellite radio communications via the signal 17 as in the second embodiment illustrated in FIG. 7. In the latter case, the measurements can be sent by a spread frequency radio signal 17 (in dotted lines in FIG. 7). The radio signal 17 then has the same bandwidth and power spectral density level constraints as the distance measurement signal 11. This low rate signal Dk(t) is sufficient to return the measurements of the arrival times trk(n) and, if appropriate, system information such as the state of operation and of calibration of the remote station SDk, and/or the time measurement ΔTk necessary to the synchronization of the local clock Tk with the local clock To of the central station in the case of the second embodiment illustrated in FIG. 7.

The invention claimed is:

1. A system for locating a geostationary satellite of a satellite telecommunication system, comprising:

at least one station emitting telecommunications signals, a transponder on board said satellite, having a bandwidth B, the at least one station receiving the telecommunications signals, a central station emitting a specific signal distinct from the telecommunications signals, the specific signal comprising a stream of binary data, having periodic events, with spread spectrum, the bandwidth of which is included in B, and transmitted via the transponder of the telecommunications satellite, wherein at least three measurement stations receive the specific signal emitted by the central station, including means for measuring the time of arrival of the specific signal, and wherein the central and measurement stations, of known positions, include synchronization means with a common time base, and further comprising means for uploading the measurements from the measurement stations to a computation centre, and further comprising a computation centre for computing the position of the satellite which comprises means for determining the position of the geostationary satellite on the basis of the distances between the central station and each measurement station via the satellite, computed from measurements of the times of arrival made by the measurement stations.

2. The system according to claim 1, wherein the common time base is the time base of a satellite positioning system and in that the synchronization means of the central station and of the measurement stations include means for receiving satellite positioning signals.

3. The system according to claim 1, wherein the central station includes a local clock which is the common time base, and the synchronization means of the central station and of the measurement stations include means for emitting and receiving a two-way satellite time and frequency information transfer signal.

4. The system according to claim 1, wherein the measurement uploading means use the transponder of the satellite telecommunications system, and the measurement stations have means for transmitting a spread-spectrum signal, the bandwidth of which is included in B and which comprises a stream of binary data including said measurements, and in that the central station has means for receiving said signal to recover the measurements and means for sending the recovered measurements to the computation centre.

5. The system according to claim 1,
wherein the central station includes a local clock which is the common time base, and the synchronization means of the central station and of the measurement stations include means for emitting and receiving a two-way satellite time and frequency information transfer signal, and wherein the measurement uploading means use the transponder of the satellite telecommunications system, and the measurement stations have means for transmitting a spread-spectrum signal, the bandwidth of which is included in B and which comprises a stream of binary data including said measurements, and in that the central station has means for receiving said signal to recover the measurements and means for sending the recovered measurements to the computation centre, and wherein the two-way transfer signal from the central station to the measurement station is the emitted specific signal and, from the measurement station to the central station is the signal including said measurements, these signals also including the time and frequency information.

6. The system according to claim 1, wherein the central station is also a receiving measurement station.

7. The system according to claim 1, wherein the satellite telecommunications system operates in the frequency bands allocated to the broadcasting satellite service or to the fixed satellite service or to the mobile satellite service.

* * * * *